US009558643B2

(12) United States Patent
Inchausti

(10) Patent No.: US 9,558,643 B2
(45) Date of Patent: Jan. 31, 2017

(54) EMERGENCY ALERT ASSEMBLY

(71) Applicant: Alexander Inchausti, Plantation, FL (US)

(72) Inventor: Alexander Inchausti, Plantation, FL (US)

(*) Notice: Subject to any disclaimer, the term of this patent is extended or adjusted under 35 U.S.C. 154(b) by 11 days.

(21) Appl. No.: 14/641,589

(22) Filed: Mar. 9, 2015

(65) Prior Publication Data

US 2016/0267766 A1   Sep. 15, 2016

(51) Int. Cl.
G08B 23/00 (2006.01)
G08B 21/08 (2006.01)
G01S 19/51 (2010.01)

(52) U.S. Cl.
CPC ............ G08B 21/086 (2013.01); G01S 19/51 (2013.01)

(58) Field of Classification Search
CPC ......... B63B 9/0005; H04N 5/33; H04N 5/332; H04N 5/2257; H04N 13/0203; H04N 13/0246; G08B 21/088; G01S 19/51; B60R 1/00
USPC ............. 340/573.6, 539.11, 987, 984, 573.1; 348/164, 148
See application file for complete search history.

(56) References Cited

U.S. PATENT DOCUMENTS

| | | | |
|---|---|---|---|
| 5,463,598 A | 10/1995 | Holland et al. | |
| 5,886,635 A | 3/1999 | Landa et al. | |
| 6,057,759 A * | 5/2000 | Marsh | G08B 21/0227 340/539.11 |
| 6,150,928 A * | 11/2000 | Murray | B60R 25/04 180/272 |
| 7,125,298 B1 | 10/2006 | Frank | |
| 7,335,077 B2 * | 2/2008 | Chiappetta | B63C 9/0005 441/80 |
| 8,384,780 B1 * | 2/2013 | Frank | H04N 5/33 348/148 |
| 9,106,810 B1 * | 8/2015 | Hadsall, Sr. | H04N 7/181 |
| 2005/0118905 A1 * | 6/2005 | Pallister | B63C 9/0005 441/80 |
| 2005/0200204 A1 * | 9/2005 | Jonsson | B63C 9/0011 307/10.3 |
| 2009/0219160 A1 * | 9/2009 | Shervey | B63C 9/0005 340/573.6 |
| 2009/0271054 A1 * | 10/2009 | Dokken | G01S 13/9307 701/21 |
| 2010/0309315 A1 * | 12/2010 | Hogasten | H04N 5/33 348/164 |
| 2010/0328106 A1 * | 12/2010 | Marshall | B63C 9/0005 340/984 |

(Continued)

Primary Examiner — Hoi Lau

(57) ABSTRACT

An emergency alert assembly includes a base unit that may be positioned within a control room of a maritime vessel. A base control circuit is positioned within the base unit. A plurality of actuators, a base transceiver, a display, a gps and an alarm are coupled to the base unit and the base control circuit. The base transceiver may be in electromagnetic communication with an external communications network. The base transceiver selectively initiates an alarm sequence when an individual falls overboard. The gps marks the coordinates of the maritime vessel when the base transceiver initiates the alarm sequence. The alarm emits an audible alert when the base transceiver initiates the alarm sequence. A power supply is coupled to the base unit and the base control circuit. A detection network monitors a perimeter of the maritime vessel. The detection network detects when the individual falls overboard.

5 Claims, 4 Drawing Sheets

(56) References Cited

U.S. PATENT DOCUMENTS

| | | | |
|---|---|---|---|
| 2011/0279673 A1* | 11/2011 | Teich | B63B 49/00 348/148 |
| 2012/0224063 A1* | 9/2012 | Terre | G08B 13/1963 348/148 |
| 2012/0229282 A1* | 9/2012 | Zagami | G08B 13/183 340/573.6 |
| 2013/0141234 A1* | 6/2013 | Alicea-Ibern | G08B 21/088 340/539.11 |
| 2013/0169809 A1* | 7/2013 | Grignan | B63C 9/0005 348/148 |
| 2013/0214942 A1* | 8/2013 | Joss | G08B 21/088 340/984 |
| 2013/0271301 A1* | 10/2013 | Kabel | B63B 49/00 340/987 |
| 2016/0214534 A1* | 7/2016 | Richards | B60R 1/00 |

\* cited by examiner

EMERGENCY ALERT ASSEMBLY

BACKGROUND OF THE DISCLOSURE

Field of the Disclosure

The disclosure relates to alert devices and more particularly pertains to a new alert device for immediately notifying a user that an individual has fallen overboard from a maritime vessel.

SUMMARY OF THE DISCLOSURE

An embodiment of the disclosure meets the needs presented above by generally comprising a base unit that may be positioned within a control room of a maritime vessel thereby facilitating a rescue of an individual who falls overboard from the maritime vessel. A base control circuit is positioned within the base unit. A display is coupled the base unit. A plurality of actuators is coupled to the base unit. Each of the actuators is electrically coupled to the base control circuit such that the actuators control operational parameters of the base control circuit. A base transceiver is positioned within the base unit. The base transceiver is electrically coupled to the base control circuit. The base transceiver may be in electromagnetic communication with an external communications network. The base transceiver selectively initiates an alarm sequence when the individual falls overboard. A gps is positioned within the base unit. The gps is electrically coupled to the base control circuit. The gps determines coordinates of the maritime vessel. The base unit marks the coordinates of the maritime vessel when the base transceiver initiates the alarm sequence. The gps may locate the individual thereby facilitating a rescue effort. An alarm is positioned within the base unit. The alarm is electrically coupled to the base control circuit such that the alarm emits an audible alert when the base transceiver initiates the alarm sequence. A power supply is positioned within the base unit. The power supply is electrically coupled to the base control circuit. A detection network is coupled to the maritime vessel such that the detection network electronically monitors a perimeter of the maritime vessel. The detection network detects motion between the perimeter of the maritime vessel and a surface of water, allowing the detection network to detect when the individual falls overboard from the maritime vessel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
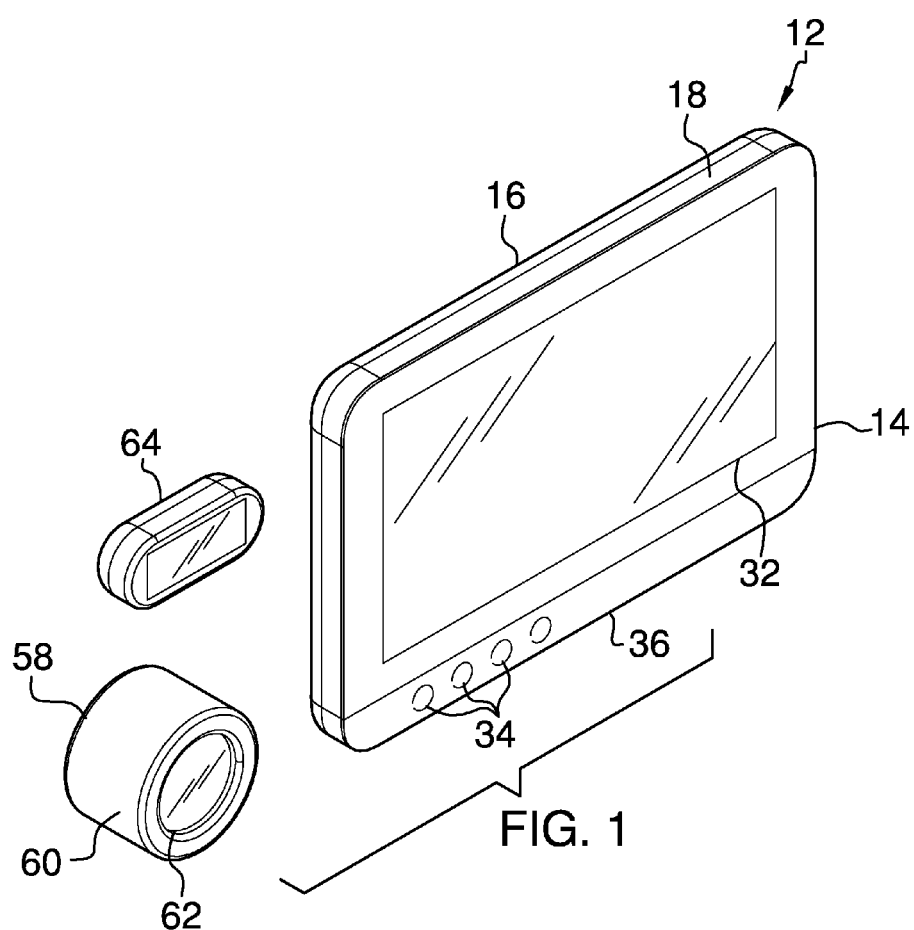
FIG. 1 is a perspective view of an emergency alert assembly according to an embodiment of the disclosure.
Figure 2:
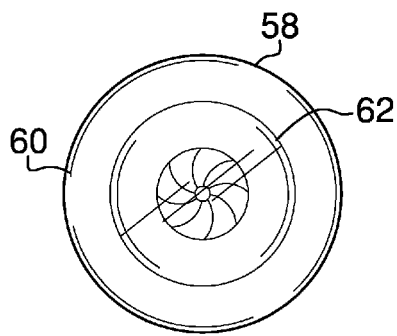
FIG. 2 is a front view of an embodiment of the disclosure.
Figure 3:
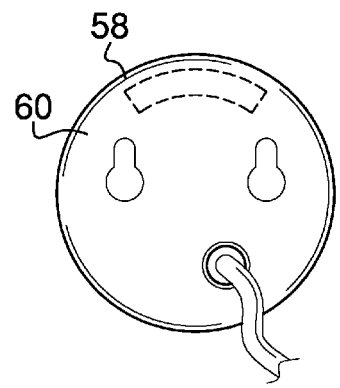
FIG. 3 is a back view of an embodiment of the disclosure.
Figure 4:
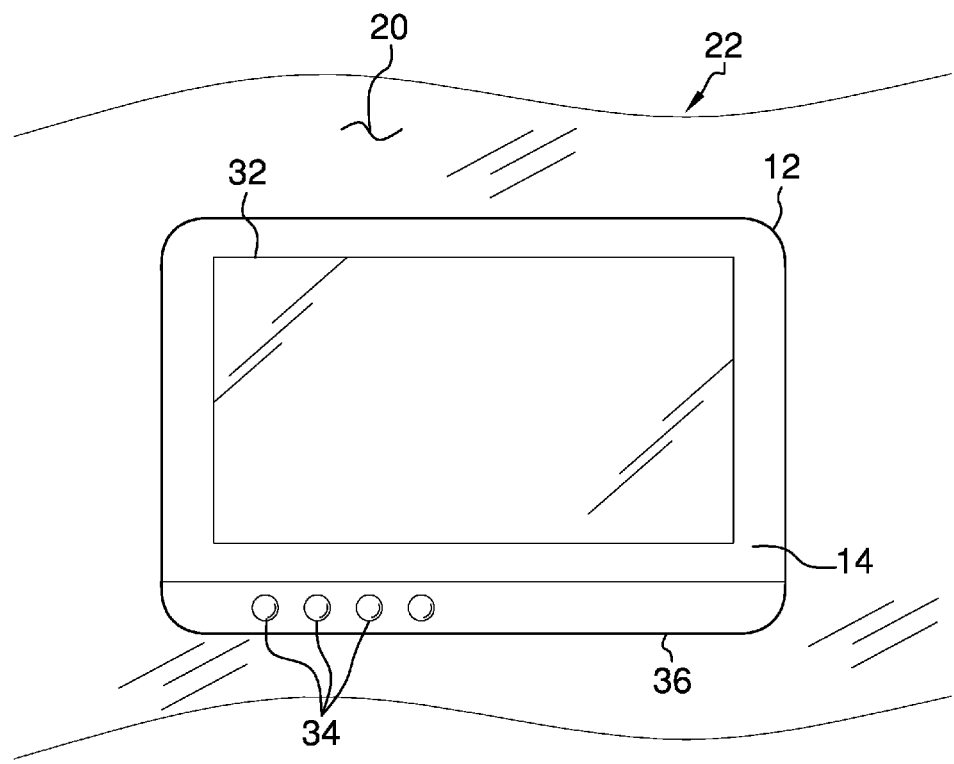
FIG. 4 is a front perspective view of an embodiment of the disclosure.
Figure 5:
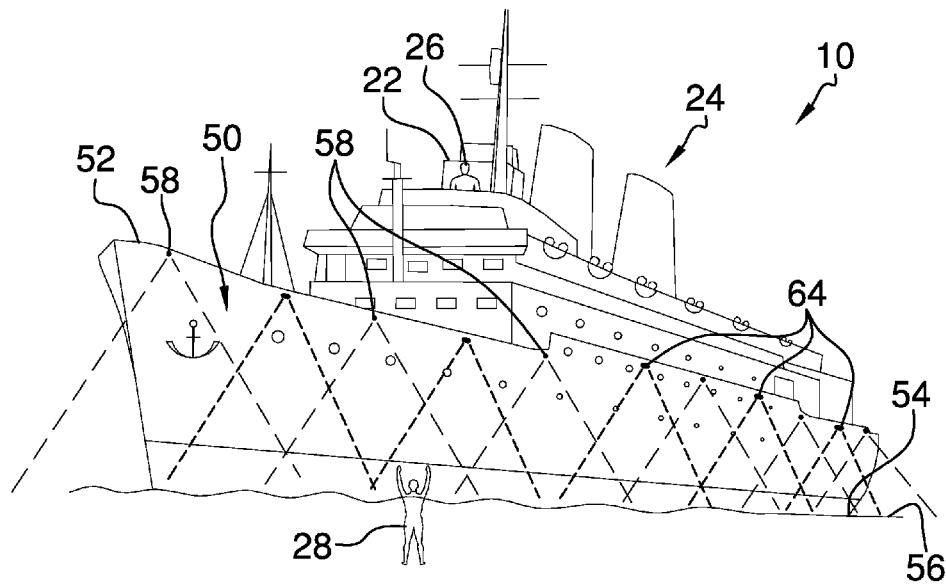
FIG. 5 is an in-use view of an embodiment of the disclosure.
Figure 6:
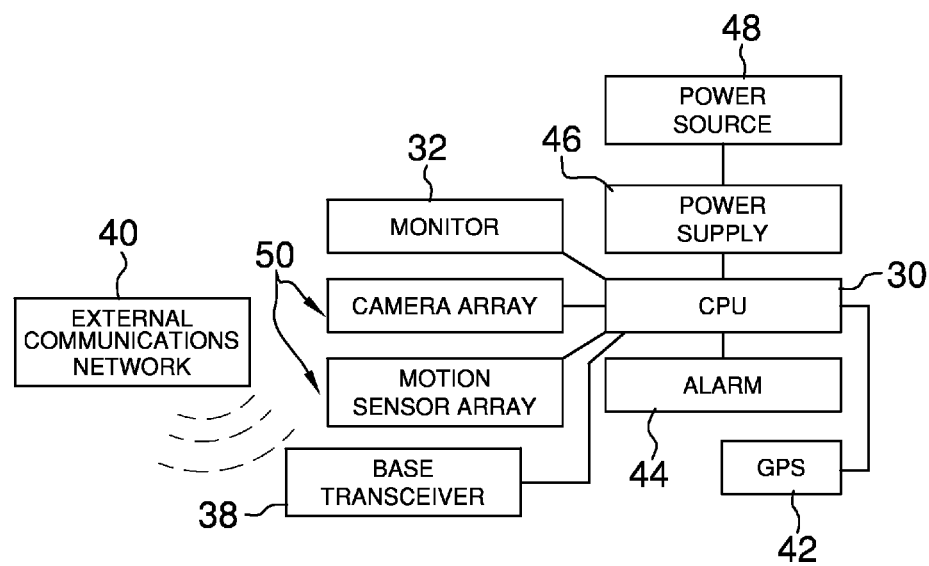
FIG. 6 is a schematic view of an embodiment of the disclosure.
Figure 7:
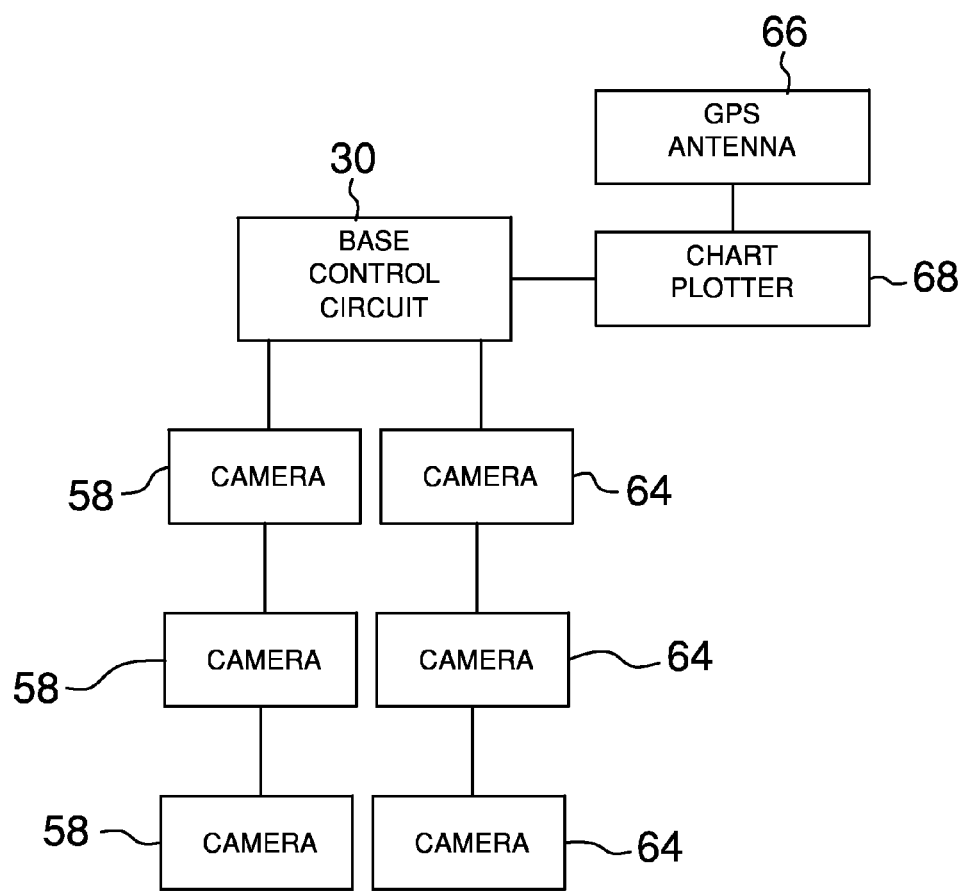
FIG. 7 is a schematic view of an embodiment of the disclosure.

With reference now to the drawings, and in particular to FIGS. 1 through 7 thereof, a new alert device embodying the principles and concepts of an embodiment of the disclosure and generally designated by the reference numeral 10 will be described.

As best illustrated in FIGS. 1 through 7, the emergency alert assembly 10 generally comprises a base unit 12 that has a front wall 14, a back wall 16 and a peripheral wall 18 coupled to and extending between the front 14 and back 16 walls. The back wall 16 may be coupled to a support surface 20 within a control room 22 of a maritime vessel 24, making the front wall 14 visible to a user 26. The maritime vessel 24 may be a cruise ship, cargo vessel or other similar maritime vessel 24 designed to carry passengers or a crew. The base unit 12 facilitates a rescue of an individual 28 that falls overboard from the maritime vessel 24.

A base control circuit 30 is positioned within the base unit 12. A display 32 is coupled to the front wall 14 of the base unit 12, making the display 32 visible to the user 26. The display 32 is electrically coupled to the base control circuit 30. The display 32 may be an LCD or the like.

A plurality of actuators 34 is coupled to the front wall 14 of the base unit 12. The actuators 34 are positioned between the display 32 and a bottom side 36 of the peripheral wall 18 of the base unit 12. Each of the actuators 34 is electrically coupled to the base control circuit 30 such that the actuators 34 control operational parameters of the base control circuit 30.

A base transceiver 38 is positioned within the base unit 12. The base transceiver 38 is electrically coupled to the base control circuit 30. The base transceiver 38 is in electromagnetic communication with an external communications network 40. The base transceiver 38 may be an RF transceiver utilizing a Maritime VHF signal or the like. The external communications network 40 may be a radio network, telephone network or the like. The base transceiver 38 selectively initiates an alarm sequence when the individual 28 falls overboard.

A gps 42 is positioned within the base unit 12. The gps 42 is electrically coupled to the base control circuit 30. The gps 42 determines coordinates of the maritime vessel 24. The base unit 12 marks the coordinates of the maritime vessel 24 when the base transceiver 38 initiates the alarm sequence. The gps 42 may locate the individual 28 thereby facilitating a rescue effort.

An alarm 44 is positioned within the base unit 12. The alarm 44 is electrically coupled to the base control circuit 30. The alarm 44 emits an audible alert when the base transceiver 38 initiates the alarm sequence. The alarm 44 notifies the user 26 when the individual 28 has fallen overboard.

A power supply 46 is positioned within the base unit 12. The power supply 46 is electrically coupled to the base control circuit 30. The power supply 46 is electrically coupled to a power source 48. The power source 48 may be the maritime vessel's electrical system.

A detection network 50 is provided. The detection network 50 is coupled to the maritime vessel 24 to electronically monitors a perimeter 52 of the maritime vessel 24. The detection network 50 detects motion between the perimeter 52 of the maritime vessel 24 and a surface 54 of water 56. The detection network 50 may detect when the individual 28 falls overboard from the maritime vessel 24. The maritime vessel may have a gps antenna 66 and a chart plotter 68. The detection network 50 may be in electrical communication with the gps antenna 66 and the chart plotter 68 thereby facilitating the chart plotter 68 to provide a location of the individual 28 in the water 56 with respect to the maritime vessel 24.

The detection network 50 comprises a plurality of cameras 58. Each of the cameras 58 has an outer wall 60 surrounding a lens 62. The outer wall 60 may be curved, giving the each of the cameras 58 a cylindrical shape. Each of the cameras 58 may be coupled to the perimeter 52 of the maritime vessel 24. The cameras 58 are evenly spaced apart, allowing the cameras 58 to monitor the entire perimeter 52 of the maritime vessel 24.

Each of the cameras 58 is positioned to observe the water 56 proximate the maritime vessel 24. Each of the cameras 58 is in electromagnetic communication with the base transceiver 38, allowing the display 32 to display an image recorded by the cameras 58. Each of the cameras 58 may comprise a hermetically sealed digital camera or the like.

A plurality of sensors 64 is provided. Each of the sensors 64 may be coupled to the maritime vessel 24. The sensors 64 are evenly spaced apart, allowing the sensors 64 to monitor the entire perimeter 52 of the maritime vessel 24. Each of the sensors 64 detects motion to detect when the individual 28 falls overboard from the maritime vessel 24. Each of the sensors 64 is in electromagnetic communication with the base transceiver 38. The base transceiver 38 initiates the alarm sequence when the sensors 64 detect the individual 28 has fallen overboard. Each of the sensors 64 may be motion detectors or the like.

In use, the sensors 64 immediately notify the user 26 when the individual 28 has fallen overboard, thereby preventing the maritime vessel 24 from traveling a great distance before the user 26 realizes the individual 28 has fallen overboard. The base transceiver 38 communicates the gps coordinates of the individual 28 to the external communications network 40 to facilitate a third party rescue effort. Additionally, the display 32 displays the location of the individual 28 with respect to the maritime vessel 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An emergency alert assembly configured to alert authorities when an individual falls overboard from a maritime vessel, said assembly comprising:
    a base unit configured to be positioned within a control room of a maritime vessel thereby facilitating a rescue of an individual who falls overboard from the maritime vessel;
    a base control circuit positioned within said base unit;
    a display coupled said base unit;
    a plurality of actuators coupled to said base unit, each of said actuators being electrically coupled to said base control circuit such that said actuators control operational parameters of said base control circuit;
    a base transceiver positioned within said base unit, said base transceiver being electrically coupled to said base control circuit, said base transceiver being configured to be in electromagnetic communication with an external communications network, said base transceiver selectively initiating an alarm sequence when the individual falls overboard;
    a gps positioned within said base unit, said gps being electrically coupled to said base control circuit, said gps determining coordinates of the maritime vessel, said base unit marking the coordinates of the maritime vessel when said base transceiver initiates said alarm sequence wherein said gps is configured to locate the individual thereby facilitating a rescue effort;
    an alarm positioned within said base unit, said alarm being electrically coupled to said base control circuit such that said alarm emits an audible alert when said base transceiver initiates said alarm sequence;
    a power supply positioned within said base unit, said power supply being electrically coupled to said base control circuit; and
    a detection network configured to be coupled to the maritime vessel such that said detection network electronically monitors a perimeter of the maritime vessel, said detection network detecting motion between the perimeter of the maritime vessel and a surface of water such that said detection network is configured to detect when the individual falls overboard from the maritime vessel;
    wherein said detection network comprising a plurality of cameras, each of said cameras being configured to be coupled to the maritime vessel, said cameras being evenly spaced apart such that said cameras are configured to monitor an entire perimeter of the maritime vessel, each of said cameras being positioned to observe water proximate the maritime vessel, each of said cameras being in electromagnetic communication with said base transceiver wherein said display displays an image recorded by said cameras; and
    wherein said detection network further comprising a plurality of sensors, each of said sensors being configured to be coupled to the maritime vessel and directed downwardly such that a range of the sensors is configured to extend both forwardly and rearwardly from said sensor, said sensors being evenly spaced apart such that said sensors are configured to monitor the entire perimeter of the maritime vessel, each of said sensors detecting motion such that said sensors are configured to detect when the individual falls overboard from the maritime vessel, each of said sensors being in electromagnetic communication with said base transceiver wherein said base transceiver initiates said alarm sequence when said sensors detect the individual has fallen overboard, said sensors alternating in position with said cameras wherein said cameras and said sensors are configured to overlap in monitoring of the water around the maritime vessel.

2. The assembly according to claim 1, wherein said base unit having a front wall, a back wall and a peripheral wall coupled to and extending between said front and back walls, said back wall being configured to be coupled to a support surface within the control room of the maritime vessel such that said front wall is visible to a user.

3. The assembly according to claim 2, wherein said display being coupled to said front wall of such that said display is configured to be visible to a user, said display being electrically coupled to said control circuit.

4. The assembly according to claim 2, wherein said actuators being positioned between said display and a bottom side of said peripheral wall of said base unit.

5. An emergency alert assembly configured to alert authorities when an individual falls overboard from a maritime vessel, said assembly comprising:
 a base unit having a front wall, a back wall and a peripheral wall coupled to and extending between said front and back walls, said back wall being configured to be coupled to a support surface within a control room of a maritime vessel such that said front wall is visible to a user thereby facilitating a rescue of an individual who falls overboard from the maritime vessel;
 a base control circuit positioned within said base unit;
 a display coupled to said front wall of said base unit such that said display is configured to be visible to the user, said display being electrically coupled to said control circuit;
 a plurality of actuators coupled to said front wall of said base unit such that said actuators are positioned between said display and a bottom side of said peripheral wall of said base unit, each of said actuators being electrically coupled to said base control circuit such that said actuators control operational parameters of said base control circuit;
 a base transceiver positioned within said base unit, said base transceiver being electrically coupled to said base control circuit, said base transceiver being configured to be in electromagnetic communication with an external communications network, said base transceiver selectively initiating an alarm sequence when the individual falls overboard;
 a gps positioned within said base unit, said gps being electrically coupled to said base control circuit, said gps determining coordinates of the maritime vessel, said base unit marking the coordinates of the maritime vessel when said base transceiver initiates said alarm sequence wherein said gps is configured to locate the individual thereby facilitating a rescue effort;
 an alarm positioned within said base unit, said alarm being electrically coupled to said base control circuit such that said alarm emits an audible alert when said base transceiver initiates said alarm sequence;
 a power supply positioned within said base unit, said power supply being electrically coupled to said base control circuit;
 a detection network configured to be coupled to the maritime vessel such that said detection network electronically monitors a perimeter of the maritime vessel, said detection network detecting motion between the perimeter of the maritime vessel and a surface of water such that said detection network is configured to detect when the individual falls overboard from the maritime vessel, said detection network comprising
  a plurality of cameras, each of said cameras being configured to be coupled to the maritime vessel, said cameras being evenly spaced apart such that said cameras are configured to monitor an entire perimeter of the maritime vessel, each of said cameras being positioned to observe water proximate the maritime vessel, each of said cameras being in electromagnetic communication with said base transceiver wherein said display displays an image recorded by said cameras, and
  a plurality of sensors, each of said sensors configured to be coupled to the maritime vessel and directed downwardly such that a range of the sensors is configured to extend both forwardly and rearwardly from said sensor, said sensors being evenly spaced apart such that said sensors are configured to monitor the entire perimeter of the maritime vessel, each of said sensors detecting motion such that said sensors are configured to detect when the individual falls overboard from the maritime vessel, each of said sensors being in electromagnetic communication with said base transceiver wherein said base transceiver initiates said alarm sequence when said sensors detect the individual has fallen overboard, said sensors alternating in position with said cameras wherein said cameras and said sensors are configured to overlap in monitoring of the water around the maritime vessel.

* * * * *